United States Patent
Patton et al.

(10) Patent No.: US 9,906,736 B2
(45) Date of Patent: Feb. 27, 2018

(54) COMPACT THERMAL AIMING SIGHT

(71) Applicant: Rochester Precision Optics, LLC, Rochester, NY (US)

(72) Inventors: Edward Patton, Rochester, NY (US); Robert Benson, Rochester, NY (US)

(73) Assignee: Rochester Precision Optics, LLC, Rochester, NY (US)

( * ) Notice: Subject to any disclaimer, the term of this patent is extended or adjusted under 35 U.S.C. 154(b) by 0 days.

(21) Appl. No.: 14/530,810

(22) Filed: Nov. 2, 2014

(65) Prior Publication Data
US 2015/0054964 A1 Feb. 26, 2015

Related U.S. Application Data

(63) Continuation of application No. 13/804,374, filed on Mar. 14, 2013, now abandoned.

(51) Int. Cl.
*H04N 5/33* (2006.01)
*F41G 1/32* (2006.01)
(Continued)

(52) U.S. Cl.
CPC .............. *H04N 5/33* (2013.01); *F41G 1/32* (2013.01); *F41G 3/165* (2013.01); *F41J 5/10* (2013.01);
(Continued)

(58) Field of Classification Search
CPC ....................................................... H04N 5/33
See application file for complete search history.

(56) References Cited

U.S. PATENT DOCUMENTS

| 4,346,995 A | 8/1982 | Morris |
| 5,497,266 A | 3/1996 | Owen |

(Continued)

FOREIGN PATENT DOCUMENTS

DE   102004047576.8 A1   6/2006

OTHER PUBLICATIONS

ATN Corp's operator's manual for the ATN ThOR 2 Thermal Optical Riflescope, titled, "ATN ThOR Series Thermal Optical Riflescopes operator's manual," EFS file name 20150302_14-530810_IDS_NPL_cite1.

(Continued)

*Primary Examiner* — David Porta
*Assistant Examiner* — Hugh H Maupin
(74) *Attorney, Agent, or Firm* — Bond, Schoeneck & King, PLLC; William Greener

(57) ABSTRACT

A sight attachable to a weapon and comprising an objective lens, an image display, and a digital reticle. The objective lens focuses infrared light received from a scene onto a thermal imager, which is comprised of a focal plane array that detects infrared radiation in the scene focused by the lens. The image display is in signal communication with the thermal imager and provides an image of the received infrared light from the scene. The image rendered by the display is visible to the user. The digital reticle is rendered on the display and provides an aim point of the weapon upon a target in the scene. The image of the scene and superimposed reticle are directly viewable by a user with the aim point of the weapon upon the target being maintained constant over a range of viewing angles that depart from a viewing angle perpendicular to the display.

12 Claims, 3 Drawing Sheets

(51) Int. Cl.
*F41G 3/16* (2006.01)
*F41J 5/10* (2006.01)
*G01J 5/10* (2006.01)
*G02B 23/14* (2006.01)
*G01J 5/00* (2006.01)

(52) U.S. Cl.
CPC .............. *G01J 5/10* (2013.01); *G02B 23/14* (2013.01); *G01J 2005/0077* (2013.01); *G01J 2005/0081* (2013.01); *G01J 2005/106* (2013.01)

(56) References Cited

U.S. PATENT DOCUMENTS

| | | | |
|---|---|---|---|
| 5,614,715 A | 3/1997 | Jones et al. | |
| 6,208,461 B1 | 3/2001 | Gaber | |
| 7,319,557 B2 | 1/2008 | Tai | |
| 7,333,270 B1 | 2/2008 | Pochapsky et al. | |
| 7,764,434 B2 | 7/2010 | Hakansson et al. | |
| 7,787,012 B2 | 8/2010 | Scales et al. | |
| 7,848,015 B2 | 12/2010 | Baker | |
| 7,911,687 B2 | 3/2011 | Scholz | |
| 8,009,958 B1 | 8/2011 | Schick et al. | |
| 8,065,807 B2 | 11/2011 | Rucinski | |
| 8,254,746 B2 | 8/2012 | Schick et al. | |
| 8,336,777 B1 | 12/2012 | Patuso | |
| 9,113,061 B1 * | 8/2015 | Morley | H04N 5/23293 |
| 2005/0018041 A1 | 1/2005 | Towery | |
| 2007/0035824 A1 * | 2/2007 | Scholz | 359/399 |
| 2008/0060248 A1 * | 3/2008 | Pine et al. | 42/114 |
| 2012/0033195 A1 * | 2/2012 | Tai | F41G 1/38 356/4.01 |
| 2012/0090216 A1 | 4/2012 | Li | |
| 2012/0102808 A1 | 5/2012 | Matthews et al. | |
| 2012/0126002 A1 * | 5/2012 | Rudich | F41G 11/001 235/404 |
| 2012/0159833 A1 | 6/2012 | Hakanson et al. | |
| 2012/0167439 A1 | 7/2012 | Jock | |

OTHER PUBLICATIONS

Screenshot showing properties of "ATN ThOR Series Thermal Optical Riflescopes operator's manual" document obtained from American Technologies Network Corporation website http://www.atncorp.com/atn-nightvision-thermal-weaponsight-thor-2-archived, as evidence of document sourcing. EFS file name 20150302_14-530810_IDS_NPL_cite2.

ATN Corp's specification sheet for the ATN ThOR 2 Thermal Optical Riflescope, "Thermal Optical Riflescope ThOR 2 COLOR Specifications," EFS file name 20150302_14-530810_IDS_NPL_cite3.

* cited by examiner

COMPACT THERMAL AIMING SIGHT

CROSS-REFERENCE TO RELATED PATENT APPLICATIONS

This application is a continuation of copending U.S. patent application Ser. No. 13/804,374, filed on Mar. 14, 2013, the disclosure of which is incorporated herein by reference.

BACKGROUND

Technical Field

A sight for aiming a weapon that fires projectiles. More particularly, a sight mountable on a weapon and having a visual display of the intended target to be struck by a projectile.

Description of Related Art

Various types of sights are used on projectile-firing weapons to improve accuracy in the delivery of the projectile to its intended target in a range of applications including hunting and defense. Simple open alignment type sights are fixed to the barrel of the weapon. Optical telescopic are also known, wherein a telescope is mounted on the barrel of the weapon, provided with a reticle (cross-hairs), and aligned with the barrel so that the location of the cross-hairs on a target as seen by a user coincides with the location where a projectile fired by the weapon will strike.

Telescopic sights and open alignment type sights have the disadvantage of requiring alignment of the target, the telescope or open alignment sight, and the user's eye along a common axis. If the circumstances of the defense or hunting situation prevent the user from aligning his eye with the sight and target, the sight cannot be effectively used. The sight is limited by parallax and/or viewing arrangement, and/or line of sight.

Telescopic and open alignment sights are also limited by the available visible light illuminating the target. The user of the weapon must have sufficient light to be able to see and recognize the target. In dim or dark conditions (such as indoors, or at dusk, dawn, or night time), telescopic and open alignment sights are not effective if the user cannot adequately see the target.

Some alternative sights use an imaging device, such as a camera, and present an image of the target to the user of the weapon. However, such alternative sights include at least one optical element between a display of the image acquired by the camera and the user's eye in order to focus the image and/or magnify it. Accordingly, because of the presence of such an optical element, the user's eye must be aligned with an axis that is substantially perpendicular to the display and centered in any image rendered on the display. Such sights are still limited by parallax and/or viewing arrangement, and/or line of sight.

What is needed is a weapon sight that provides an image of a target scene in all lighting conditions, and presents the image to a user of the weapon in a manner that does not require a specific alignment of the user's eye with the sight.

SUMMARY

In accordance with the present disclosure, for a user aiming a projectile-firing weapon, the problem of aiming the weapon at a target in low lighting conditions while not being aligned with the weapon and the target is solved by a sight attachable to the weapon and comprising an objective lens, an image display, and a digital reticle with particular features and arrangement. The objective lens focuses infrared light received from a scene onto a thermal imager, which is comprised of a focal plane array that detects infrared radiation in the scene focused by the lens. The image display is in signal communication with the thermal imager and provides an image of the received infrared light from the scene. The image rendered by the display is in the visible spectrum, so that it is visible to the user of the weapon. The digital reticle is rendered on the display and defines an aim point of the weapon upon a target in the scene. The image of the scene and the superimposed reticle are directly viewable by a user with the aim point of the weapon upon the target being maintained constant over a range of viewing angles that depart from a viewing angle perpendicular to the display. In other words, there is no parallax effect or line of sight issue by viewing the display at an "off angle," i.e., an angle that is not perpendicular to the image surface of the display. In that manner, the weapon and sight are rendered usable even if the user cannot look at the sight in a straight line relative to the target.

The image of the scene and the superimposed reticle are simultaneously directly viewable by a user. The sight may include an image processor receiving signals representative of the scene, and containing an algorithm to process the signals and communicate processed signals to the image display. The digital reticle may be communicated by the image processor to the image display. At least one of the shape, size, color, brightness, and location of the digital reticle rendered on the image display may be variable, and may be selectable by the user.

The sight may include a user interface in communication with the image processor. The user interface may be configured to specify at least one feature selected from display color gamut, display brightness, display contrast, and shape, size, color, brightness, and location of the digital reticle rendered on the image display.

In certain embodiments, zero magnification is provided between an eye of the user and the display. In other embodiments, the sight may include angle enhancing and/or protective optics contiguous with the surface of the display providing the image. The angle enhancing and/or protective optics may cause between zero and 1× magnification of the image rendered by the display, while still maintaining the aim point of the weapon upon the target over a range of viewing angles.

BRIEF DESCRIPTION OF THE DRAWINGS

The present disclosure will be provided with reference to the following drawings, in which like numerals refer to like elements, and in which.

Figure 1:
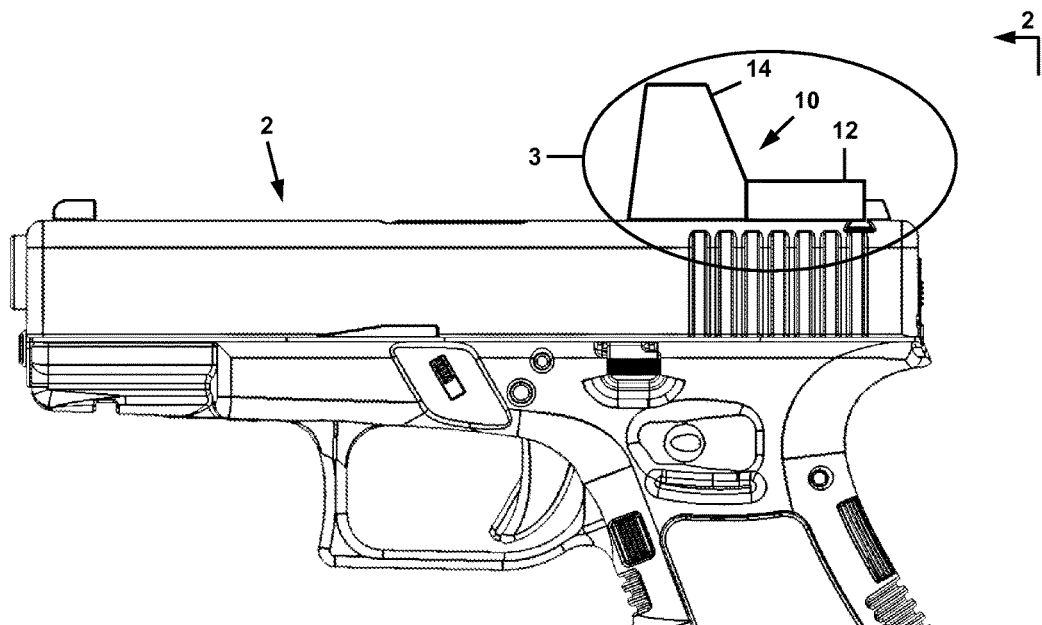
FIG. 1 is a side elevation view of a sidearm weapon including the thermal sight of the present disclosure.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present disclosure, reference is made to the drawings. In the drawings, like reference numerals have been used throughout to designate identical elements. In the following disclosure, the present invention is described in the context of its use as a thermal sight for a weapon. However, it is not to be construed as being limited only to use in weapon aiming applications. The invention is adaptable to any use in which aiming or alignment of an object relative to another object is desirable. Additionally, the description may identify certain components with the adjectives "top," "upper," "bottom," "lower," "left," "right," etc. These adjectives are provided in the context of the orientation of the drawings, which is arbitrary. The description is not to be construed as limiting the instant sight to use in a particular spatial orientation. The instant sight may be used in orientations other than those shown and described herein.

With reference now to FIGS. 1-5, the thermal sight 10 is shown mounted on a sidearm, and more specifically, a semiautomatic handgun 2. It is to be understood that the thermal sight may be mounted on other weapons, such as revolver pistols, rifles, shotguns, mortars, howitzers, bows (i.e., archery weapons), and the like. Although the thermal sight 10 is generally intended for weapons that are portable by a single individual, the sight 10 may be mounted on and used on larger weapons that require more than one individual to move and/or operate, and on weapons that are not instantly portable, i.e., those weapons mounted on some sort of fixture. The sight 10 may be scaled larger or smaller than shown in FIGS. 1-5 to match the particular weapon in use.

The sight 10 is comprised of an objective lens 20, a thermal imager 30, and an image display 40. The objective lens 20 focuses infrared radiation or light 7 received from a scene onto the thermal imager 30. The thermal imager 30 is comprised of a focal plane array that detects infrared light from the scene focused by the lens 20. The objective lens 20 is capable of focusing infrared light, and the thermal imager is capable of detecting infrared light. The IR light may be between about 3 microns and 15 microns in wavelength such as a microbolometer thermal sensor such as the ULIS Pico 640E.

The image display 40 is in signal communication with the thermal imager 30 and provides an image of the received infrared light from the scene that may be viewed by a user. The image is rendered by the display 40 in the visible spectrum, i.e., having light output between about 400 nanometers and about 700 nanometers in wavelength, so that it is visible to the user of the weapon. In certain embodiments, the display may be a color display. In other embodiments, the display may be a monochrome display rendering an image grey scale, or rendering an image in a single color hue but of varying saturation and/or luminance. In certain embodiments, the display 40 may be an electroluminescent display. Other displays, including but not limited to liquid crystal displays, LED displays, and OLED displays are contemplated.

A digital reticle 50 is rendered on the display 40 and provides an aim point 6 (i.e. the desired point of impact of a projectile fired from the weapon 2) upon a target 4 in the scene. The image of the scene including an image 4A of the target 4 and the rendered reticle 50 are directly viewable by a user of the weapon 2 and sight 10. Because the image of the scene including target 4, and the superimposed digital reticle 50 are directly viewable by the user, rather than being further optically conditioned by optics disposed between the display and the user, the aim point 6 of the weapon 2 upon the target 4 is maintained constant over a range of viewing angles that depart from a viewing angle perpendicular to the display 40. In other words, there is no parallax or line of sight effect by viewing the display 40 at an "off angle," i.e., an angle that is not perpendicular to the display 40.

Figure 2:
FIG. 2 is a rear elevation view of a sidearm weapon with the thermal sight of FIG. 1, taken along line 2-2 of FIG. 1.
Figure 2:
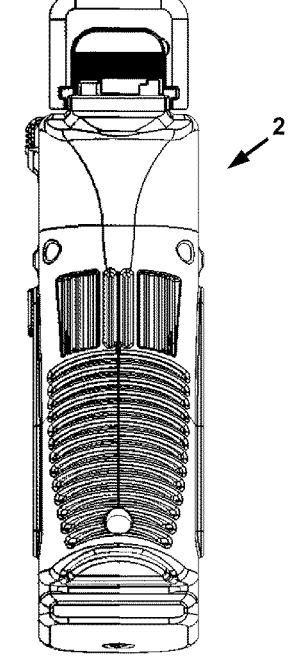
Figure 3:
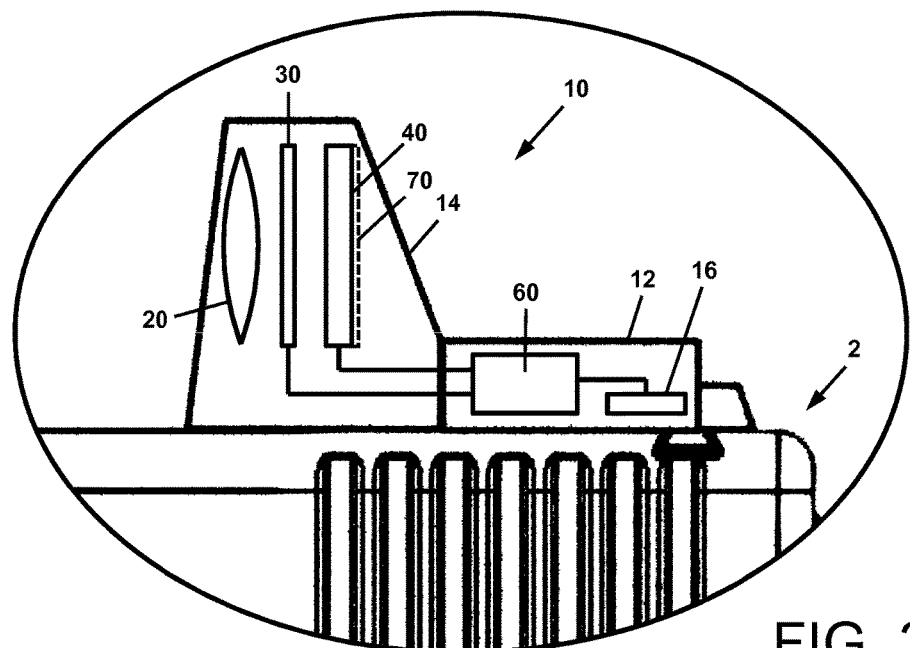
FIG. 3 is a detailed schematic view of the thermal sight contained in ellipse 3 of FIG. 1.
Figure 4:
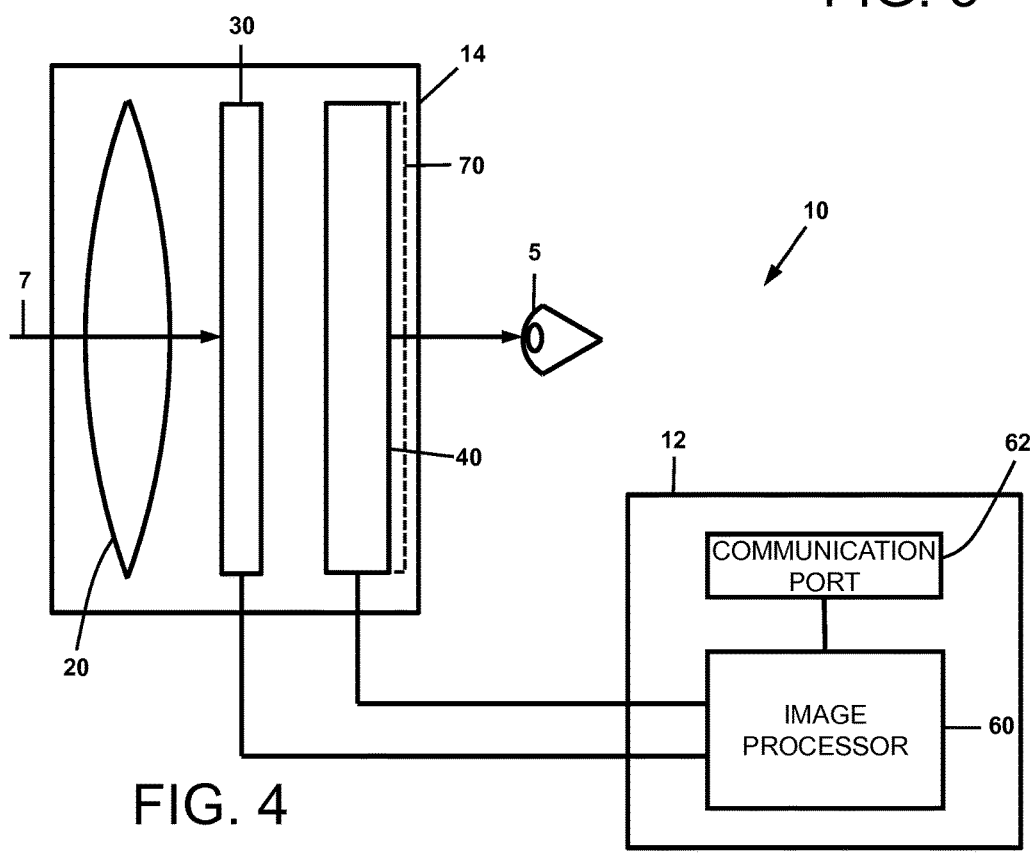
FIG. 4 is a block diagram of the thermal sight of FIG. 3.
Figure 5:
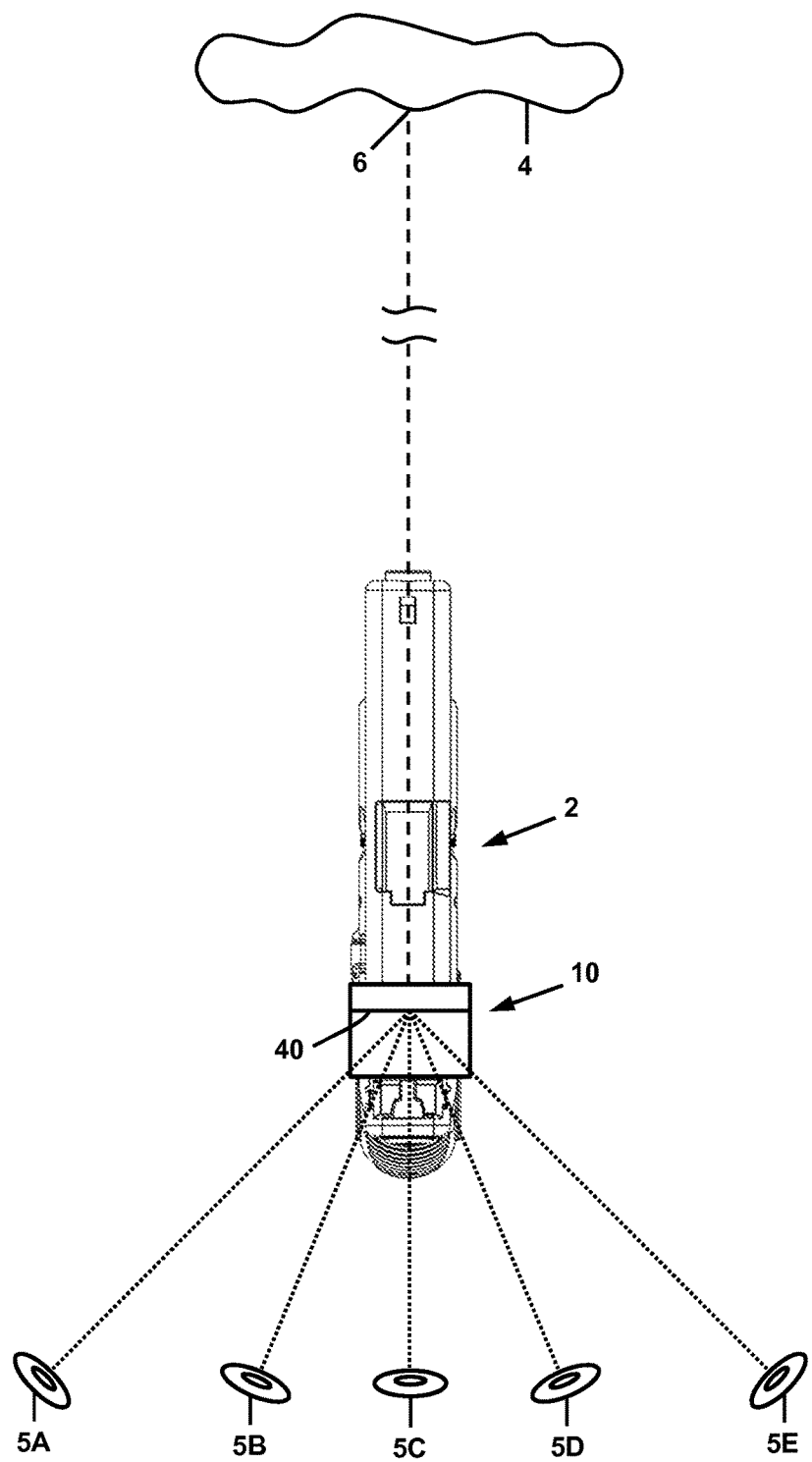
FIG. 5 is a top view of the sidearm weapon of FIG. 1, shown being aimed at a target with the thermal sight being usable over a range of viewing angles.

This is best understood with reference to FIGS. 2 and 5. Referring first to FIG. 5, there is depicted a top view of the weapon 2 and sight 10, with a user's eye 5 depicted as viewing the image on the display 40 of the sight 10 at a range of different viewing angles, i.e., at eye positions 5A-5E. (It will be apparent that the eye 5 may also be positioned above or below the plane of FIG. 5, at any angle departing from an axis perpendicular to display 40.) Because the image of the scene including target 4 and the superimposed digital reticle 50 are directly viewable by the user, then over a range of viewing angles, the user will still see the image 4A of the target 4 and digital reticle 50 as shown in FIG. 3. There is no parallax effect such that the location of the digital reticle 50 on the target image 4A changes with viewing angle over the range of viewing angles. In that manner, the weapon 2 and sight 10 are rendered usable even if the user cannot look at the sight 10 in a straight line relative to the target 4. Advantageously, in a dangerous defense situation such as in law enforcement or combat, the user can extend the weapon 2 around edge of an object that is providing protective cover, view the target 4, see that the weapon 2 is aimed at the desired aim point 6 on the target by viewing the image of the digital reticle 50 and target 4A on the display 40, and fire a projectile at an enemy (the target 4), all while not having his eye(s) in a straight line with the sight and the target 4, which would otherwise expose his head, neck, and/or "cardiac triangle" to mortal return fire from the enemy.

The range of viewing angles at which the user can clearly see the image of the digital reticle 50 and target 4A on the display 40 is dependent upon the type of display used. However, with current displays as recited above, the angle may be between about plus or minus 80 degrees from an axis perpendicular to the display 40. Mechanical obscuration of the housing 12 of sight 10 can impinge upon maximum viewing angle. Also, factors such as reflection and ambient light may limit viewing angle. The viewing angle may be improved by adding an anti-reflective viewing enhancing protective screen, which may include an anti-reflective coating.

The image of the scene and the superimposed reticle 50 are simultaneously directly viewable by a user. "Simultaneously" in this context is meant to indicate that the user perceives that he is viewing the image of the scene and the superimposed reticle 50 simultaneously as one image. This may be accomplished by providing image data to the display 40 that includes both the image of the scene and the image of the digital reticle 50, or by rapidly providing images of the scene interspersed with images of the digital reticle 50 at a "refresh rate" that is sufficiently fast so as to render the image of the scene and the image of the digital reticle 50 to be perceived as a single image by the user.

The sight 10 may include an image processor 60 that receives signals from the thermal imager 30 that are representative of the scene. The image processor 60 may be provided as an integrated circuit chip comprising a central processing unit, a random access memory, and a non-transitory computer storage medium such as flash memory in communication through a system bus. (As used herein, the term "non-transitory storage medium" is meant to include all computer-readable media except for a transitory, propagating signal.)

The image processor 60 may contain an algorithm to process the received image signals and communicate processed signals to the image display 40. The digital reticle 50 may be rendered using software executed by the image processor 60 and then communicated by the image processor 60 to the image display 40. The image processor 60 may be contained in a first housing 12, and the objective lens 20, thermal imager 30, and display 40 may be contained in a second housing 14. The first and second housings 12 and 14 may be formed together as a single unitary piece. One or both of the first and second housings 12 and 14 may be provided with suitable means for mounting the sight 10 on the weapon 2. For example, on a firearm, the sight 10 may be engaged with a Picatinny rail (also known as a MIL-STD-1913 rail), or a Weaver rail mount. The first housing 12 (or second housing 14) may also contain a battery 16 for providing electrical power to the thermal imager 30, display 40, and image processor 60.

The sight 10 may include a user interface (not shown) in communication with the image processor 60. The user interface may be through an external user display and computer (not shown) that communicates with the image processor through a communication port 62. The communication may be via wireless transmission, or via a hard-wired connection port (not shown) such as a Micro B USB connector used in current cell phones. Such a hardwired connection port may also be used to charge the on-board battery 16. Alternatively, the user interface may be through software programmed in the image processor 60. The user interface may be accessed and operated through the display 40, which may have a touch screen that is operated by a small hand held stylus pen or other control buttons provided on sight 10.

Via the user interface, at least one of the shape, size, color, brightness, and location of the digital reticle rendered on the image display may be variable, and may be selectable by the user. In that manner, the visibility of the digital reticle 50 may be made more visible to the user to match the lighting conditions of the application, and/or to be in greater contrast with the intended target. Additionally, by making the location of the reticle 50 programmable, the weapon may be digitally "sighted in" as opposed to mechanically sighted in. In other words, the position of the digital reticle 50 on the display 40 may be adjusted with software so that the position of the particular indicia in the reticle 50 (such as the intersection of crosshairs) on the image 4A of the target 4 coincides with the actual point of impact 6 of a projectile fired by the weapon. Additionally, the user interface may be configured to specify at least one feature selected from display color gamut, display brightness, and display contrast. In that manner, the visibility display may be optimized for use in bright sunlight conditions, dusk and/or dawn, overcast days, and nighttime. Additionally, the brightness of the display may be lowered to a point of being just sufficiently visible to a user at night, while not providing enough output to make the user's face visible to an enemy.

In certain embodiments, zero magnification is provided between an eye 5 of the user and the display 40. In other embodiments, the sight 10 may include angle enhancing and/or protective optics 70 contiguous with the surface of the display 40. The angle enhancing and/or protective optics 70 may cause between zero and 1× magnification of the image rendered by the display 40, while still maintaining the aim point 6 of the weapon 2 upon the target 4 over a range of viewing angles.

It is therefore, apparent that there has been provided, in accordance with the present invention, an apparatus for sighting a weapon. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. A direct-view sight for a weapon, the sight comprising:
   a) an objective lens focusing infrared light received from a scene onto a thermal imager, the thermal imager comprised of a focal plane array detecting infrared light in the scene focused by the lens;
   b) an image display in signal communication with the thermal imager and providing an image of the received infrared light from the scene, the image rendered in the visible spectrum; and
   c) a digital reticle rendered on the display, characterized by at least a shape having indicia that define a plurality of aim points on the reticle and further defining a plurality of aim points of the weapon upon a target in the scene;

wherein the image display containing the image of the scene and the rendered reticle is disposed for direct viewing by a user such that there is no intermediate optic between the display and the viewer's eye, and thus provides a directly viewable image of the scene and the reticle, and wherein the plurality of aim points of the weapon upon the target are maintained constant over a range of viewing angles that depart from a viewing angle perpendicular to the display.

2. The sight of claim 1, wherein the image of the scene and the rendered reticle are simultaneously directly viewable by a user.

3. The sight of claim 1, further comprising an image processor receiving signals representative of the scene, and containing an algorithm to process the signals and communicate processed signals to the image display.

4. The sight of claim 1, wherein the digital reticle is communicated by the image processor to the image display.

5. The sight of claim 4, wherein at least one of the shape, size, color, brightness, and location of the digital reticle rendered on the image display is variable.

6. The sight of claim 4, further comprising a user interface in communication with the image processor.

7. The sight of claim 6, wherein the user interface is configured to specify at least one feature selected from display color gamut, display brightness, display contrast, and shape, size, color, brightness, and location of the digital reticle rendered on the image display.

8. The sight of claim 1, wherein zero magnification is provided between an eye of the user and the display.

9. The sight of claim 1, further comprising at least one of angle enhancing and protective optics contiguous with the surface of the display providing the image.

10. A direct-view sight for a weapon, the sight comprising:
 a) an objective lens focusing infrared light received from a scene onto a thermal imager, the thermal imager comprised of a focal plane array detecting infrared light in the scene focused by the lens;
 b) an image display in signal communication with the thermal imager and providing an image of the received infrared light from the scene, the image rendered in the visible spectrum; and
 c) a digital reticle rendered on the display and defining an aim point of the weapon upon a target in the scene;
wherein the image display containing the image of the scene and the rendered reticle are disposed for direct viewing by a user such that there is no intermediate optic between the display and the viewer's eye, and thus provides a directly viewable image of the scene and the reticle, and wherein the aim point of the weapon upon the target is maintained constant over a range of viewing angles that depart from a viewing angle perpendicular to the display between plus or minus 80 degrees from the angle perpendicular to the display.

11. A direct-view sight for a weapon, the sight comprising:
 a) an objective lens focusing infrared light received from a scene onto a thermal imager, the thermal imager mountable on the weapon and comprised of a focal plane array detecting infrared light in the scene focused by the lens;
 b) an image display in signal communication with the thermal imager and providing an image of the received infrared light from the scene, the image rendered in the visible spectrum; and
 c) a digital reticle rendered on the display and defining an aim point of the weapon upon a target in the scene;
wherein the image display containing the image of the scene and the rendered reticle are disposed for direct viewing by a user such that there is no intermediate optic between the display and the viewer's eye, and thus provides a directly viewable image of the scene and the reticle, and wherein the aim point of the weapon upon the target is maintained constant over a range of viewing angles that depart from a viewing angle perpendicular to the display between plus or minus 80 degrees from the angle perpendicular to the display.

12. The sight of claim 11, wherein when operationally mounted on the weapon the image display is the rear-most sighting component mounted on the weapon.

* * * * *